(12) United States Patent
Grant et al.

(10) Patent No.: US 10,530,776 B2
(45) Date of Patent: Jan. 7, 2020

(54) DYNAMIC COGNITIVE ACCESS CONTROL LIST MANAGEMENT

(71) Applicant: International Business Machines Corporation, Armonk, NY (US)

(72) Inventors: Robert H. Grant, Austin, TX (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 15/196,715

(22) Filed: Jun. 29, 2016

(65) Prior Publication Data
US 2018/0007053 A1    Jan. 4, 2018

(51) Int. Cl.
*H04L 29/06*    (2006.01)

(52) U.S. Cl.
CPC .......... *H04L 63/101* (2013.01); *H04L 63/102* (2013.01)

(58) Field of Classification Search
CPC ...... H04L 63/101; H04L 63/102; H04L 63/20
See application file for complete search history.

(56) References Cited

U.S. PATENT DOCUMENTS

| | | | |
|---|---|---|---|
| 6,292,904 B1 * | 9/2001 | Broomhall | G06F 21/335 709/217 |
| 8,083,675 B2 | 12/2011 | Robinson et al. | |
| 8,275,803 B2 | 9/2012 | Brown et al. | |
| 8,743,708 B1 | 6/2014 | Robertson et al. | |
| 8,752,132 B2 | 6/2014 | Smith et al. | |
| 8,803,690 B2 | 8/2014 | Junqua et al. | |
| 8,806,578 B2 | 8/2014 | Ivanov et al. | |
| 8,838,538 B1 | 9/2014 | Landau et al. | |
| 9,264,451 B2 | 2/2016 | Chari et al. | |
| 9,292,675 B2 | 3/2016 | Husain | |

(Continued)

FOREIGN PATENT DOCUMENTS

| | | |
|---|---|---|
| WO | WO2009/052442 A2 | 4/2009 |
| WO | WO2014/052938 A1 | 4/2014 |

OTHER PUBLICATIONS

Anonymous, "Access Control List (ACL) for Physical Enclosures to Control Access to Virtual Servers as they are Provisioned, Moved, or Migrated Between Multiple Physical Servers Allowing for Managing Dynamism", IP.com, IP.com No. IPCOM000224587D, Jan. 2, 2013, 5 pages.

(Continued)

*Primary Examiner* — John B King
(74) *Attorney, Agent, or Firm* — Stephen J. Walder, Jr.; Nicholas D. Bowman

(57) ABSTRACT

Mechanisms are provided for implementing a cognitive access control. The mechanisms receive an access request from a requestor for accessing a resource and generate a context for the resource based on one or more first corpora of information regarding the resource. The mechanisms further generate a requestor profile for the requestor based on one or more second corpora of information regarding the requestor, other users, and relationships between the requestor and the other users. In addition, the mechanisms compare elements of the context for the resource with elements of the requestor profile, generate a decision as to whether to grant or deny the access request based on results of the comparison, and control access to the resource based on the decision.

20 Claims, 4 Drawing Sheets

(56) References Cited

U.S. PATENT DOCUMENTS

| | | |
|---|---|---|
| 2007/0245018 A1 | 10/2007 | Bhola et al. |
| 2008/0004949 A1* | 1/2008 | Flake ................. G06F 21/6245 |
| | | 705/14.69 |
| 2008/0082538 A1* | 4/2008 | Meijer ................ G06F 21/6218 |
| 2008/0104393 A1* | 5/2008 | Glasser .............. G06F 21/6218 |
| | | 713/165 |
| 2009/0265551 A1* | 10/2009 | Tripunitara ........... H04L 63/101 |
| | | 713/168 |
| 2009/0287678 A1 | 11/2009 | Brown et al. |
| 2011/0066587 A1 | 3/2011 | Ferrucci et al. |
| 2011/0125734 A1 | 5/2011 | Duboue et al. |
| 2011/0191862 A1* | 8/2011 | Mandava .............. H04W 12/08 |
| | | 726/28 |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2015/0046973 A1 | 2/2015 | Gross et al. |
| 2015/0378789 A1 | 12/2015 | Jackson |
| 2016/0014155 A1 | 1/2016 | Brucker et al. |
| 2016/0072814 A1 | 3/2016 | Martinelli |
| 2016/0078236 A1* | 3/2016 | Chesla ................... H04L 41/22 |
| | | 726/1 |
| 2016/0078248 A1 | 3/2016 | Price et al. |
| 2017/0279829 A1* | 9/2017 | Vasseur ............... H04L 41/0893 |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Naldurg, Prasad et al., "Dynamic Access Control: Preserving Safety and Trust for Network Defense Operations", Proceedings of the 8th ACM Symposium on Access Control Models and Technologies 2003 (SACMAT'03), Jun. 2-3, 2003, pp. 231-237.

Yuan, Michael J., "Watson and healthcare, How natural language processing and semantic search could revolutionize clinical decision support", IBM developerWorks, IBM Corporation, Apr. 12, 2011, 14 pages.

* cited by examiner

DYNAMIC COGNITIVE ACCESS CONTROL LIST MANAGEMENT

BACKGROUND

The present application relates generally to an improved data processing apparatus and method and more specifically to mechanisms for providing dynamic cognitive management of access control lists.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory where the memory comprises instructions which are executed by the processor to configure the processor to implement a cognitive access control system. The method comprises receiving, by the cognitive access control system, an access request from a requestor for accessing a resource and generating, by the cognitive access control system, a context for the resource based on one or more first corpora of information regarding the resource. The method further comprises generating, by the cognitive access control system, a requestor profile for the requestor based on one or more second corpora of information regarding the requestor, other users, and relationships between the requestor and the other users. In addition, the method comprises comparing, by the cognitive access control system, elements of the context for the resource with elements of the requestor profile, generating, by the cognitive access control system, a decision as to whether to grant or deny the access request based on results of the comparison, and controlling, by the cognitive access control system, access to the resource based on the decision.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
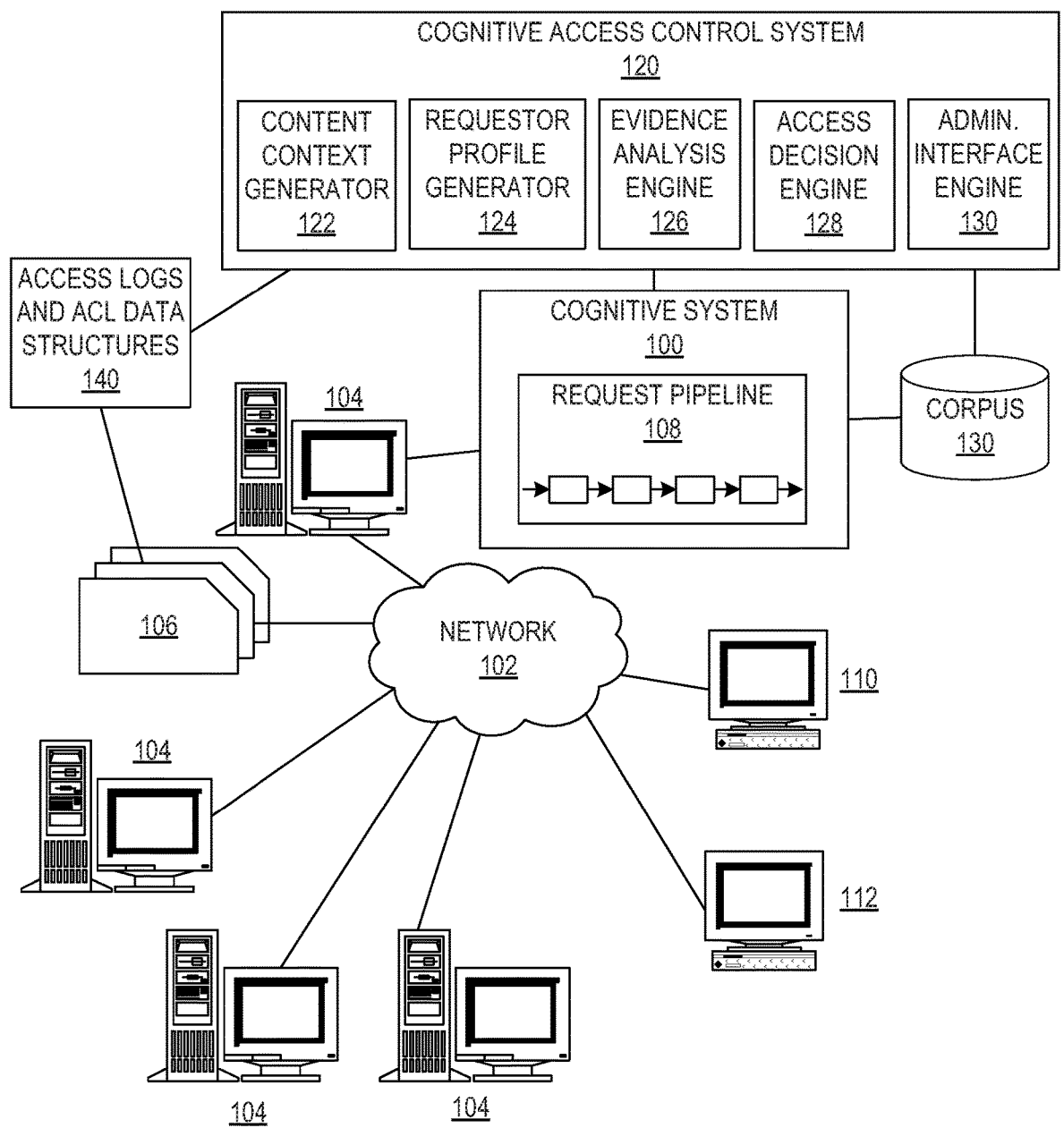
FIG. 1 depicts a schematic diagram of one illustrative embodiment of a cognitive access control system in a computer network.

The illustrative embodiments provide mechanisms for providing dynamic cognitive access control list management. With the mechanisms of the illustrative embodiments, determinations as to whether to provide access to content, and which types of access to provide, are made based on a dynamic cognitive assessment of a projected purpose for which the access is requested, as well as characteristics of the requestor relative to the content for which access is requested, and characteristics of other users having a relationship with the requestor and/or relationship or prior access to the content or similar content. These characteristics may include, for example, the relationships the requestor has with these other users that have access to the content, a network or community of users with which the requestor interacts, similarities of characteristics of the requestor with other users that have access to the same or similar types of content, content of communications exchanged by the requestor with other users, a dynamically determined degree of security that should be afforded to the content based on an evaluation of the accessibility of the content by other users, etc.

The cognitive assessment may involve generating a model, or profile, of a collective of users associated with the requestor and their characteristics which may then be compared to access control information that is dynamically determined and associated with the content, in order to determine if this particular requestor should be provided access to the content and what types of access to provide. Thus, the requestor himself/herself need not be specifically identified and added to any static access control lists but rather a cognitive representation of the requestor based on the requestor's associations and other characteristic information, such as role, job description, level of seniority, the requestor's accessibility of other content and the characteristics of the other content, etc. may be used to perform a cognitive assessment of the requestor that provides dynamic cognitive access control for the content. This dynamic cognitive access control may be provided on a temporary basis, e.g., only during a current session, for a limited amount of time, or the like, after which the dynamic cognitive access control assessment would need to be repeated. In some cases, if the dynamic cognitive access control assessment is performed successfully, i.e. access is granted, more than a predetermined number of times, the requestor may be added to a static access control list or a notification may be sent to an administrator recommending adding the requestor to the static access control list data structure for the content in order to avoid having to perform dynamic cognitive access controls again for the same combination of requestor and content.

The illustrative embodiments provide an improvement over known access control mechanisms which typically require static definitions of access rights as well as access control lists. While the illustrative embodiments may utilize such static access control lists as a starting point for performing cognitive assessments, the illustrative embodiments do not stop with such evaluation of static access control lists and instead makes a dynamic determination of whether access should be granted to the requestor, i.e. the requestor is the type of user that should be provided access to the content even though the requestor may not be included on any associated static access control list, based on the characteristics of the requestor, characteristics of the content being accessed, and the characteristics of similar/related users and content.

Moreover, the illustrative embodiments are a further improvement over known access control mechanisms in that known systems typically require significant human intervention to manually manage access control lists and to determine which persons are permitted access to particular portions of content or sources of content. For example, assume that a user is part of a group of users that have access to a particular website. Data access permissions and access control lists may be used to control access to the website such that only the designated group of users may access the website. However, the membership in the group may change frequently. Thus, a human administrator must be employed to manage the permissions as the membership in the group changes. A human administrator must continually monitor the membership of the group to add/remove users as well as modify permissions based on a human evaluation of the access needs of the various users. This is a costly endeavor that can be alleviated by the mechanisms of the illustrative embodiments, as described hereafter.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
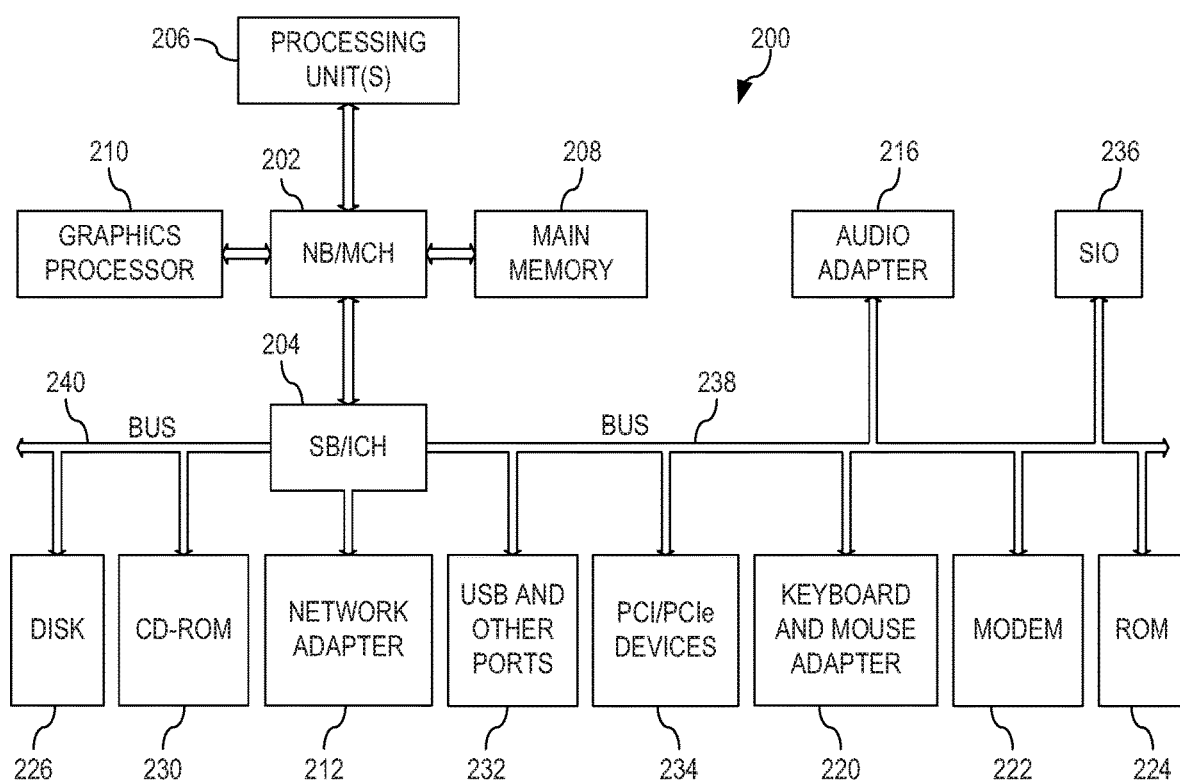
FIG. 2 is a block diagram of an example data processing system in which aspects of the illustrative embodiments are implemented.
Figure 3:
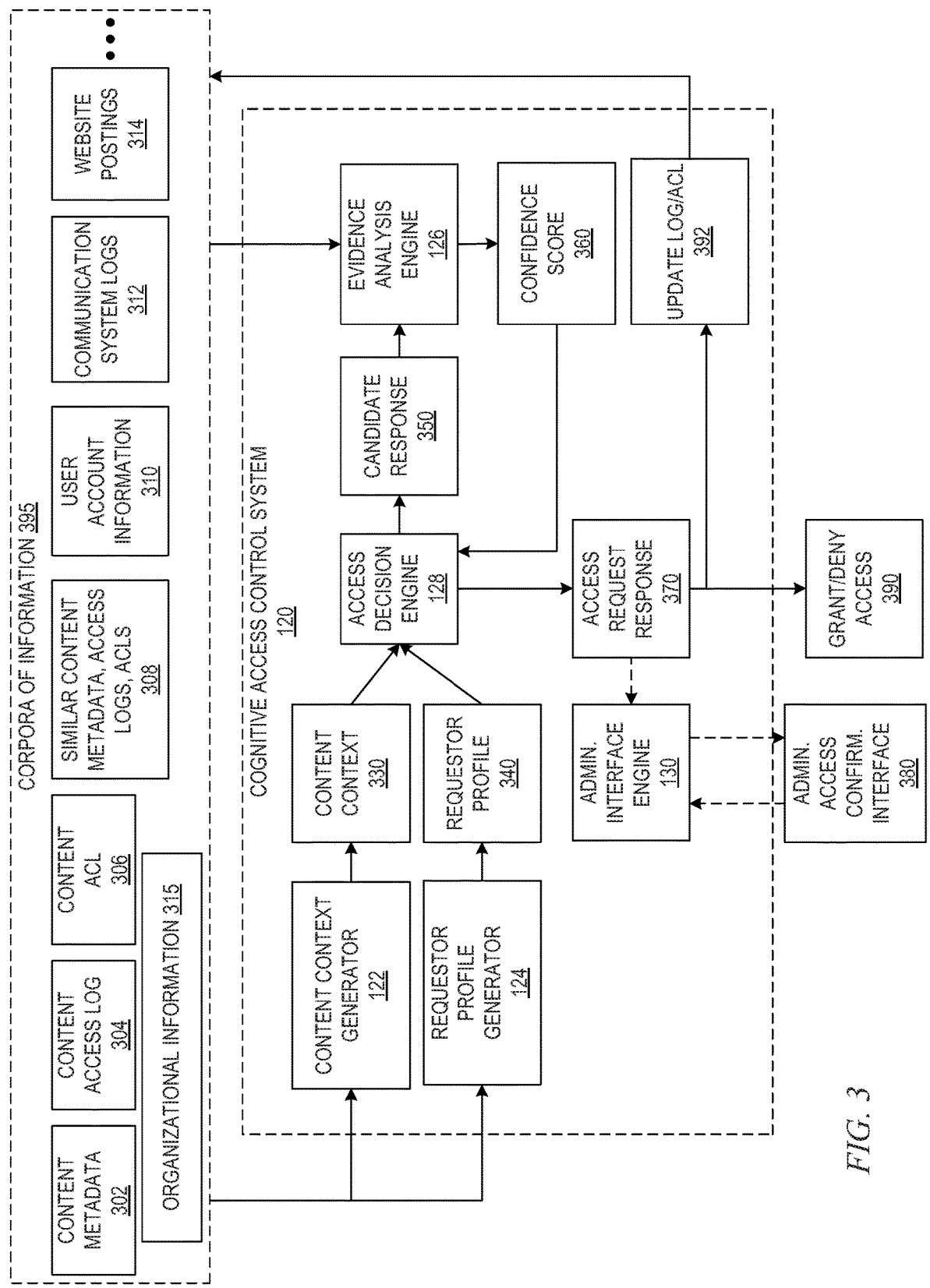
FIG. 3 is an example block diagram illustrating an operation of a cognitive access control system when performing dynamic access control decisions for a portion of content in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1 and 2 are directed to describing an example cognitive system, methodology, and computer program product with which the mechanisms of the illustrative embodiments are implemented. The cognitive system in the depicted example makes use of a request processing pipeline which comprises various logic and data structures for facilitating the processing of a request with regard to accessing a portion of content. The portion of content may be any type of content rendered in a digital format including data structures, databases, media content, electronic documents, portions of electronic documents, electronic communications or the like. Moreover, the content may in fact represent physical systems, electronic devices, or any other mechanism that may be accessed through electronic means, e.g., access to particular storage systems, access to particular computing devices, locking/unlocking doors via electronic locking mechanisms, or any other physical mechanism whose access may be controlled via a computing device or system implementing a cognitive access control system in accordance with the illustrative embodiments. For purposes of the following discussion of example embodiments, it will be assumed that a requestor is requesting access to a portion of media content, however, as noted above, the illustrative embodiments are not limited to such.

With regard to FIG. 1, the cognitive system 100, while shown as having a single request pipeline 108, may in fact have multiple request pipelines having associated logic elements, shown as a plurality of stages of processing. The logic of the request pipeline(s) 108 may comprise logic for performing various functions associated with cognitive analysis and evaluation of requests including, but not limited to, natural language processing, question answering, corpus ingestion and annotation, and the like. In some illustrative embodiments, the request pipeline(s) 108 may comprise a cognitive search engine, natural language processing system, or even the IBM Watson™ QA system available for International Business Machines (IBM) Corporation of Armonk, N.Y. The cognitive system 100 and request pipeline(s) 108 may take a request in a structured or unstructured format, dynamically process the request using cognitive access control system 120 based on information about the resource being accessed and the requestor as described hereafter, and generate a response as to whether access to the resource, e.g., a portion of media content in the following examples, is granted, denied, or the request is elevated to a next level of evaluation.

In some example embodiments, as noted above, the cognitive system 100 may employ one or more QA pipelines 108 each of which may be, for example, the IBM Watson™ QA pipeline. QA systems and QA pipelines such as the IBM Watson™ QA pipeline, are generally known in the art and a more detailed descriptions is therefore not provided herein.

An example description of a QA pipeline in which aspects of the illustrative embodiments may be utilized is provided in U.S. Pat. No. 8,275,803.

In such an embodiment where multiple QA pipelines 108 are utilized, each QA pipeline may be separately trained for answer input questions of a different domains or be configured to perform the same or different analysis on input questions, depending on the desired implementation. In the context of the present invention, the "questions" are in essence a request for access to a particular resource, e.g., "Can User A access Resource R?", or a request for a particular type of access, e.g., "Can User A WRITE to Resource R?" The QA pipeline(s) 108 may operate on such an input "question" (access request) by performing their operations for natural language processing, feature extraction, candidate answer generation, evidence evaluation, and the like, based on an associated corpus 130 or corpora. In the case of multiple QA pipelines 108, each QA pipeline may have their own associated corpus or corpora that they ingest and operate on, e.g., one corpus for financial domain of an organization and another corpus for an information technology domain of an organization. In some cases, the QA pipelines may each operate on the same domain of input questions but may have different configurations, e.g., different annotators or differently trained annotators, such that different analysis and potential answers are generated, where in the context of the present invention the "answer" is whether to allow access, deny access, or elevate the request to a next level of evaluation. In the multiple pipeline embodiments, the QA system may provide additional logic for routing input questions (access requests) to the appropriate QA pipeline, such as based on a determined domain of the input question (access request), combining and evaluating final answers generated by multiple QA pipelines, and other control and interaction logic that facilitates the utilization of multiple QA pipelines.

In some embodiments, separate instances of the cognitive access control system 120 may be associated with separate request pipelines 108 or a single cognitive access control system 120 operate in conjunction with multiple request pipelines 108. It should be appreciated that while FIG. 1 illustrates the cognitive access control system 120 as being separate from the cognitive system 100, this is only for illustration purposes. The cognitive access control system 120 may be a separate system or it may be integrated into the cognitive system 100 and/or stages of logic within the request pipeline 108. Any configuration of the cognitive access control system 120 and cognitive system 100 may be used without departing from the spirit and scope of the present invention.

As will be discussed in greater detail hereafter, the illustrative embodiments are integrated in, augment, and extend the functionality of the cognitive system 100 with regard to performing dynamic cognitive access control list management for controlling access to resources, such as media content, electronic documents, data structures, physical systems, devices or mechanisms, or any other types of resources for which access may be controlled through computing devices. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA pipeline or QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

The QA pipeline receives an input question, parses the question to extract the major features of the question, uses the extracted features to formulate queries, and then applies those queries to the corpus of data, e.g., corpus 130. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

In the context of the present invention, in embodiments that utilize a cognitive system 100 having a QA pipeline implemented request pipeline 108, the input question that is processed by the cognitive system 100 and request pipeline 108 is in actuality a request for access for a particular resource. Thus, the input "question" may not be posed as a natural language question but may be submitted as a structured or unstructured access request that may be interpreted as an input question by the request pipeline 108 which is configured to handle such access requests via the cognitive access control system 120.

To illustrate this operation further, consider again FIG. 1 which depicts a schematic diagram of one illustrative embodiment of a cognitive system 100 implementing a request pipeline 108 in a computer network 102. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables access request processing for one or more cognitive system users via their respective computing devices 110-112. Other embodiments of the cognitive system 100 may be used with components, systems, sub-systems, and/or devices other than those that are depicted herein.

The cognitive system 100 is configured to implement a request pipeline 108 that receives inputs from various sources. For example, the cognitive system 100 receives input from the network 102, a corpus of information 106 (comprising data structures, databases, electronic documents, or the like), cognitive system users, and/or other data and other possible sources of input. In one embodiment, some or all of the inputs to the cognitive system 100 are routed through the network 102. The various computing devices 104 on the network 102 include access points for content and data structure creators and cognitive system users. Some of the computing devices 104 include devices for a database storing the corpus of information 106 (which is shown as a separate entity in FIG. 1 for illustrative purposes only). Portions of the corpus of information 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the cognitive system 100 is used, in conjunction with the cognitive access control system 120, to control access to content provided in one or more data structures accessible via the network 102, such as media content, electronic document content, or the like, that may be provided from data sources 106. The content includes any file, text, article, media content, data structure, database, or any other source of data for use in the cognitive system 100. Cognitive system users access the cognitive system 100 via a network connection or an Internet connection to the network 102, and input access requests to the cognitive system 100 that are responded to by the cognitive system 100 to allow, deny, or elevate the access request and thereby dynamically control access to the content in the data sources 106. In one embodiment, the access requests are formed using natural language, but in other illustrative embodiments, the access requests may be provided in a structured format. The cognitive system 100 parses and interprets the access request via the request pipeline 108, and provides a response to the cognitive system user, e.g., cognitive system user 110.

The response may be to provide access to the requested content, deny access to the requested content, or elevate the request to a higher level of evaluation in a multi-level security access control protocol. In the case of a denial of access, an appropriate notification may be returned to the requestor's computing device 110 via the network 102 indicating the denial and possibly a reason for the denial, e.g., insufficient permissions or the particular type of access being denied, such as "write access" not permitted. In the case of elevation of the request to a higher level of evaluation, a notification may be sent to a human administrator, such as via the network 102 and an administrator computing device, e.g., computing device 112, to request that the human administrator authorize or deny access to the requested content.

In some illustrative embodiments, the cognitive system 100 may be the IBM Watson™ cognitive system available from International Business Machines Corporation of Armonk, N.Y., which is augmented with the mechanisms of the illustrative embodiments described herein. As outlined previously, a request pipeline 108 of the IBM Watson™ cognitive system 100 receives an input access request, which may be treated as an input question, which it then parses to extract the major features of the input access request, e.g., the identity of the requestor, the content for which access is requested, the type of access requested, etc., that in turn are then used to formulate queries that are applied to the corpus 130. Based on the application of the queries to the corpus 130, a candidate response is generated by looking across the corpus 130 for portions of data that have some potential for containing evidence for evaluating the input access request and generating a response to the input access request.

The request pipeline 108 of the IBM Watson™ cognitive system 100 then performs deep analysis on the evidential data in each of the portions of the corpus of data found during the application of the queries using a variety of reasoning algorithms. The scores obtained from the various reasoning algorithms are then weighted against a statistical model that summarizes a level of confidence that the request pipeline of the IBM Watson™ cognitive system 100 has regarding the evidence that the potential response is correct based on a dynamically generated context of the content and a dynamically generate profile of the requestor, as generated by the cognitive access control system 120 as described hereafter. As noted above, more information about the IBM Watson™ cognitive system may be obtained, for example, from U.S. Pat. No. 8,275,803, and may also be obtained from Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a cognitive access control system 120 which operates in conjunction with the logic, data structures, and other resources of the cognitive system 100. That is, many of the logic elements, data structures, and resources of the cognitive system 100 may be used to parse an input access request and extract the features of the input access request to identify the content being accessed, the requestor, the type of access being requested, etc. This information may then be used by the logic of the cognitive access control system 120 to perform its operations for generating a content context, a requestor profile, and determine whether the type of access requested should be permitted or not, or should be elevated to a next level of evaluation. The corpus 130 analysis logic of the cognitive system 100 may also be utilized for performing evidence analysis and confidence scoring as well. These elements of logic in the cognitive system may operate on conjunction with different portions of logic in the cognitive access control system 120 in a concerted manner to achieve the functionality of the illustrative embodiments as described hereafter.

As shown in FIG. 1, the cognitive access control system 120 comprises a content context generator 122, a requestor profile generator 124, evidence analysis engine 126, access decision engine 128, and administrator interface engine 130. These elements provide logic and resources for performing the assigned operations with other operations described herein, and not attributed to any particular element, being performed by management and control logic (not shown) as implemented in the cognitive access control system 120 in general. The content context generator 122 provides the logic and resources for performing operations to generate a context for the content to which access is being requested based on an analysis of various types of information about the content including metadata of the content, access control lists (if any) associated with the content, communications exchanged by users about the content or referencing the content, identities and profile information about users that have accessed the content, etc. The content context generator 122 generates a context for the content that represents the types of users that should be allowed to access the content and the types of access they should be permitted.

It should be appreciated that this context is not limited to a static access control list but is a dynamically generated context based on a cognitive evaluation of information regarding the content. What is meant by a "dynamic" generation is that the particular context, user/requestor profile, or other data structures, are generated in response to a triggering condition, such as receipt of an access request from a requestor, for example, and are not stored prior to the triggering condition occurring. In some illustrative embodiments, the context and profiles are generated completely dynamically in response to the receipt of an access request from a requesting user, or "requestor". In other illustrative embodiments, some aspects of the context and profiles may be stored a priori with dynamic updating, verification, or augmentation of these contexts/profiles being performed in response to the receipt of an access request targeting a portion of content, electronic device, computing resource, or the like.

The requestor profile generator 124 provides the logic and resources for performing operations to generate a model or profile of the user that is requesting access to the content, referred to herein as the requestor. The operations for generating the requestor profile analyze information about the characteristics of the requestor, e.g., roles/job description of the requestor, level of seniority, access permissions already associated with the requestor, relationships the requestor has with other users, other users having similar roles or job descriptions within an organization as the requestor, access permissions associated with the request and with other users having similar characteristics, organizational information representing relationships between portions of the organization including a portion of the organization associated with the requestor, and the like. The requestor profile generator 124 generates a profile of the requestor which is an amalgam of characteristics of the requestor and other related users based on the evaluations performed. The requestor profile provides an indication as to the characteristics most representative of the requestor with regard to accessing portions of content.

Thus, for example, in one simple implementation occurrences of particular characteristics from among the requestor and the other users may be tallied and those that meet or exceed a predetermined threshold number, or a predetermined number of the highest tallied characteristics, may be selected as representative of the requestor. Of course other more complex evaluations, such as weighted evaluations based on a closeness of matching of the requestor with one of the other users, may be performed for determining the most representative characteristics of the requestor. In such a case, certain characteristics may be more heavily weighted than others depending on the desired implementation, e.g., role/job description may be given a relatively higher weight than a "numbers of communications" between the requestor and user characteristic, such that a weighted evaluation of the characteristics is generated.

The access decision engine 128 provides logic and resources for generate a candidate response to the input access request based on a comparison of the content context with the requestor profile. The evidence analysis engine 126 provides the logic and resources to then evaluate evidence from the corpus 130 that confirms or refutes this candidate response and thereby generate a confidence score that the candidate response is correct. For example, if the comparison of the content context and the requestor profile provides an initial candidate response that the requestor should be granted the requested access to the content, this candidate response is evaluated based on other evidence in the corpus 130 to determine whether this candidate response is in fact correct such that access should be granted.

The access decision engine 128 receives the results of the evidence evaluation performed by the evidence analysis engine 126 and compares the confidence score to one or more threshold confidence scores to generate a final access decision. If the confidence score meets or exceeds a first threshold confidence score indicative of a correct candidate response, then the candidate response is selected as a final response to be utilized to either provide the requested access, deny the requested access, or elevate the requested access to a human administrator or other level of further evaluation. If the confidence score does not meet or exceed this first threshold, a determination may be made as to whether another second threshold confidence score is met or exceeded that is indicative of an "unsure" confidence level, i.e. there is some evidence that supports and some evidence that refutes the candidate response such that the first confidence score threshold is not met or exceeded, but there is sufficient evidence to support the candidate response such that it cannot be determined to most likely incorrect. In such a case, the evaluation may result in a request sent to a human administrator to intervene and make a determination as to whether access should be allowed or denied.

The administrator interface engine 130 provides the logic and resources to generate notifications and user interfaces through which a human administrator is notified when intervention by a human administrator is determined to be necessary to process an access request. The operations of the administrator interface engine 130 may be instigated in response to the final result of the access decision engine being to elevate the access request processing to a level of evaluation involving a human administrator, when the second threshold confidence score is met or exceeded but the first threshold confidence score is not, i.e. it is unclear whether the candidate result of the access decision engine 128 is correct or not, or at any other time when the logic of the cognitive access control system 120 determines that human administrator intervention is warranted. The administrator interface engine 130 may generate outputs to an administrator computing device, e.g., computing device 112, and process responses from an administrator via their computing device 112 and network 102. In some cases, the administrator may be requested to confirm access of a requestor to particular content in which case the administrator interface engine 130 may send a notification or user interface to the computing device 112 identifying the requestor, the content, and the type of access requested along with user interface elements to confirm/deny the access.

The administrator interface engine 130 may receive the administrator's response via an input to the user interface selecting an appropriate user interface element and cause access decision engine 128 to select the corresponding final decision to either allow or deny the access request. Based on the final decision generated by the cognitive access control system 120, the cognitive system 100 may send appropriate control communications to cause the requestor to be able to access the requested content or block such access, as is generally known in the art.

In some illustrative embodiments, in addition to the above, the cognitive access control system 120 may dynamically modify any access control list (ACL) data structures associated with the requested content based on the decisions made by the cognitive access control system 120. These modifications may be to automatically add or remove the requestor to/from the ACL data structure associated with the content. Such modifications may be made based on a number of dynamic cognitive access control determinations made for the particular requestor with regard to the particular content. That is, a log 140 of access requests, and the decisions made by the cognitive access control system 120, for accessing the content may be maintained for a predetermined period of time. This log may be associated with the ACL data structures 140 which are in turn associated with the content 106. If the same requestor has requested access to the content repeatedly and the cognitive access control system 120 has determined a predetermined number of times that the requestor should be granted access to the content 106, then the requestor may be added to the ACL data structure for the content. This allows for the cognitive access control system 120 to avoid expenditure of resources to perform cognitive evaluations since one of the first determinations the system 120 makes is whether the requestor is already listed on the ACL data structure for the content and if so, then the access request is allowed. Similarly, if the requestor has been denied access to the content a predetermined number of times over a period of time as indicated by the logs 140, then a block list data structure may be updated to list the requestor as having their access blocked. This data structure may also be analyzed initially by the cognitive access control system 120 to make an immediate determination to deny access to the requestor if they are listed on the block list data structure of a particular portion of content. Periodically, the cognitive access control system 120 may perform a re-evaluation of the ACL data structure for a portion of content by essentially ignoring the ACL data structure for purposes of cognitive evaluation and thus, re-evaluate all requestors who request access to the particular portion of content and thereby dynamically generate a new ACL data structure over time.

Thus, in accordance with the illustrative embodiments, in order to evaluate a requestor to determine whether the requestor should be granted access to a particular portion of content, in response to receiving a request, in the cognitive system 100 of the server 104, to access the portion of content from a client device 110, a context or set of contexts for the content that is the focus of the access request is created by the content context generator 122. In addition, a cognitively generated profile for the requestor is generated by the requestor profile generator 124 based on a cognitive evaluation of the characteristics of the requestor, other similar users, and relationships and networks/communities associated with the requestor. A cognitive comparison of the context or sets of contexts with the generated profile may then be performed by a combination of the operations of the access decision engine 128 and evidence analysis engine 126, to generate a candidate decision and evaluate the candidate decision to generate a final determination as to whether to permit access, deny access, or elevate the decision to a higher level involving a human administrator. Thus, the comparison essentially determines if the requestor is the type of user that should be provided access to the content based on other users that have permission to access the content, the relationships of these other users to the requestor, types of content accessible to other users having similar characteristics to the requestor, and the like. Hence, even though the requestor may not be on an access control list associated with the content, the requestor may be dynamically permitted access to the content based on a dynamic cognitive evaluation of the requestor and the content.

As an example, consider a user John, a manager of an accounting department of an organization whose network of computing devices is as shown in FIG. 1, and who requests to access a secured portion of media content M1 in content sources 106, for which he is not listed on a corresponding access control list. The mechanisms of the illustrative embodiments, and in particular the content context generator 122 of the cognitive access control system 120, analyze information from the sources 106, other computing devices 104 and 110-114, and corpus 130 regarding the portion of media content M1 that John is requesting to access to generate a context. For example, the portion of media content M1 in the sources 106 may have metadata associated with it, users may have posted comments regarding the portion of media content M1 on websites, online forums, internal computing systems or the like, users may have communicated through instant messaging, electronic mail, or other networks of communication facilitated by computing devices 104 and 110-114, and the like. Moreover, analysis of characteristics of users that have accessed the media content M1 may also be performed to indicate what types of users have been permitted access to the media content M1, e.g., users having connections to management levels of an organization, generally having relationships directed to accounting departments, etc. The content of these communications, the metadata, and the types of users accessing the media content M1 may be used to generate a set of characteristics of the media content M1.

Such information is resident in data structures on one or more of the computing devices 104 and 110-114 or in the corpus 130 and thus, can be accessed by the cognitive system 100 and cognitive access control system 120. In some illustrative embodiments, metadata of the content M1 may be stored in association with the content M1 at the sources 106 and may be accessed from those sources 106. Other information regarding communications and users accessing the content M1 may be obtained from log and ACL data structures 140 stored on the sources 106 or in another suitable location on one or more of the computing devices 104, 110-114. Still further, some of this information may be stored in log data structures and archives that are made part of the corpus 130.

Moreover, the characteristics of the media content M1 may be compared to characteristics of other media content and users that access these other media content to determine what types of users access similar types of media content having similar levels of security access in the same or different organizations or portions of an organization. Hence, for example, it may be determined that the media content M1 is directed to future business goals for the next calendar year for the organization, users of management level of higher are given access to the media content M1 for the purpose of financial planning, users below management level have been denied access, the media content M1 has been communicated about using secure internal communications between managers but has not been publically communicated about, and other managers of other departments have accessed other media content M2, M3, and M4 each having management level access control restrictions, also having content directed to financial planning for the organization. Moreover, many users of the accounting department have accessed the content M2 and M3. All of this information together is analyzed by the content context generator 122 to form a context data structure representing the context for access control decisions for accessing the media content M1. In this particular case, the context indicates the media content M1 as being content that is secure, and thus access controls should be applied, and which should be accessible only by management level users or above for the purpose of financial planning, indicating that management level users or above in portions of the organization directed to financial planning, e.g., accounting department, CEO, CFO, and other financial related departments.

In addition to characterizing the media content M1 to generate a context data structure for the content, the mechanisms of the illustrative embodiments, and in particular the requestor profile generator 124, further generate a model, or profile, of the requestor. The profile that is built for the requestor is based on personal characteristic data about the requestor, e.g., position within an organization, security access level, role and/or job description for the requestor, level of seniority, etc., as well as a cognitive analysis of the communications and connections between the requestor and other users both within and outside a community of users that have access to the requested media content. Again, such information may be obtained from various log data structures, account profiles, organizational data structures and employee records, or any other data structures maintained by one or more of the computing devices in FIG. 1 as well as corpus 130. For example, evaluation of the connections of the requestor to other users that have accessed the media content M1 may be performed to determine a level of interaction and a nature of the interaction, e.g., frequency of communication with users that have access to the media content M1, content of the communications, organizational relationship between the requestor and these other users, etc. Various sources of information may be utilized to perform such analysis including logs of communications via one or more communication systems, internal/external website posts, telephone call logs within the organization, organizational chart data structures representing the hierarchical levels of organizations, the relationships between different sections of the organization, e.g., different organizational departments or offices, and the like. Moreover, access control information including access control lists, if any, security preference information, and the like, which may be associated with the content M1, such as via access logs and ACL data structures 140, and/or other content may be used to generate a requestor profile and/or generate the content's context.

Thus, for example, consider that the requestor, John, is a manager in an accounting department of the organization and is requesting access to media content M1 whose dynamically generated context, as generated by content context generator 122, indicates that the content of the media is directed to business goals for the next financial year, as in the example noted above, and the security level is confidential. The corpus 130 of information may be searched for references to the media content M1 to thereby identify communications and/or documentation that may indicate accesses to the media content M1 and/or information about the media content M1 that may have been distributed or otherwise communicated, as well as the users that may have performed such accesses or distribution of communications referencing the media content M1. It may be determined that users U1, U2, and U3 have communicated with each other regarding the media content M1 via secured internal electronic communications within the organization. Other sources of information may further be investigated to determine other characteristics of the media content M1 including, for example, information regarding access control preferences, as may be maintained by sources 106, e.g., only users having management level security access or higher should be allowed to access the media content M1, and access control lists, if any, that are associated with the media content M1, such as in access logs and ACL data structures 140. The characteristics of users that are listed on the access control list, if any, associated with the media content M1 may be analyzed to determine which common characteristics are present that are indicative of users that have been determined to have the requirements for accessing the media content M1, e.g., only managers are listed on the ACL for the media content M1 and the access logs indicate that users that have less than manager level security access have been denied access to the media content M1.

This information may be evaluated by the content context generator 122 along with the metadata of the media content M1 itself to determine a level of security to be afforded to the media content M1 to determine if further cognitive evaluation of the requestor, by the requestor profile generator 124, and evidential evaluations should be performed. That is, if it is determined that the media content M1 security control is relatively low, e.g., no security controls needed or the media content M1 is publically available as indicated by communications sent out by users or otherwise indicated by documentation in the corpus 130, then further cognitive evaluation of the requestor is not necessary and the requestor should be permitted to access the media content M1. This evaluation may also look to any associated access control lists of the media content M1 to determine if the requestor is already present on the static access control list 140. If so, then no further cognitive evaluation of the requestor is necessary, i.e. the requestor already has been granted access to the media content M1. Similarly, if the requestor is on a block list, then no further evaluation is necessary and the access request may be automatically denied. Otherwise, if the requestor is not already listed on an access control list, or block list, for the media content M1 and the media content M1 requires some level of access controls, then a cognitive evaluation of the requestor is to be performed by the requestor profile generator 124.

The evaluation of the security level to be afforded to the media content M1, for purposes of determining whether to perform dynamic cognitive access control evaluations of the requestor, may involve a weighted analysis of the metadata associated with the media content M1, types of communications referencing the media content M1, characteristics of the users that have or are given access to the media content M1, and characteristics of users that communicate about the media content M1 and the manner by which these communications are made, e.g., secure instant messaging, internal electronic mail, etc. Weights associated with security information in metadata associated with the media content M1 may be relatively higher than weights for access control information associated with the media content M1, which may be relatively higher than weights associated with information associated with exchanged communications, characteristics of the other users that have access to the media content and/or that have exchanged communications, etc. Thus, a weighted evaluation as to whether the media content M1 should be considered secure or unsecure for purposes of cognitive analysis of the requestor may be made by the content context generator 122 with the results being used to trigger access to the media content M1 or the further cognitive evaluation operations of elements 124-130.

Assuming that the evaluation of the security level to be afforded to the media content M1 indicates some level of access control to be applied, a context of the media content M1 is generated by the content context generator 122. The context may comprise various parameters including, for example, the level of security to be applied, a representation of the types of users that have accessed the media content M1 (this may comprise a variety of different types of users with associated measures, e.g., numbers of users of the particular type that have accessed the media content M1 or other statistical measure of relative amounts of users of each type), an evaluation of other contexts of other types of media content M2, M3, M4 of a similar nature to the media content M1, and the like. The context may be determined in various ways including evaluation and comparison of metadata and information about the media content against existing key term repositories, e.g., terms such as "confidential," "secret," recognized code names or the like, using cognitive algorithms to determine word and/or subject matter association, or any other known or later developed algorithms and mechanisms for determining a context of the content, electronic device, or computing resource.

The context provides information indicative of the types of users that should be able to access the media content M1 as determined dynamically by the content context generator 122 from an analysis of the corpus 130 of information available, access logs and ACL data structures 140, and other information available via computing devices 104, 110-114 and content sources 106, which may involve not only any access control lists and other access control information associated with the media content M1, such as provided in data structures 140, but also other information indicative of the nature of the media content M1 and users that have accessed the media content M1, and/or other similar media content M2, M3, M4. Thus, for example, if it is determined that in other organizations, only manager level users have accessed media content M2, M3, M4 that is directed to financial documents of the organization, then it is highly likely that only manager level access should be granted to media content M1. A context for the media content M1 may then be generated by the content context generator 122 that indicates that the media content M1 is directed to financial planning, requires management level security or higher to access, and cannot be distributed outside of the organization.

The information in the context may be used to compare to characteristics of a profile of the requestor to determine if the profile has the characteristics of a type of user that should be granted or denied access to the media content M1. Moreover, this context may be used to compare to the type of access requested by the requestor to determine if the requested type of access is permitted by the context, e.g., if the requestor is attempting to attach the media content M1 to a communication that is being sent to an address or domain outside the organization, and the media content M1 context indicates that the media content M1 is secure and not to be distributed outside the organization, then the requested access may be denied.

The profile of the requestor may be generated by the requestor profile generator 124 by analyzing the characteristics of the requestor, other users having similar characteristics to the requestor, and the relationships that the requestor has with other users that have access to the media content M1 or similar content, e.g., media contents M2, M3, and M4. The requestor's profile may comprise various characteristic information obtained from the data mining and evaluation performed by the requestor profile generator 124 including, but not limited to, a type of role or job description, level of seniority, access levels to other resources, etc., that is a collective representation of the requestor based on evaluation of the requestor and other users.

For example, the requestor may be identified, from organizational data, to be an employee of the organization, currently located in the accounting department, currently holding a position of a manager of a group of certified public accountants (CPAs) in the accounting department, and having management level access permissions. The organizational data may indicate that the requestor is associated with users U1, U2, and U3 in that the requestor is the manager of users U1 and U2 and is a subordinate to user U3. Moreover, the requestor may have a same role within the organization as other users U4 and U5, each of which have access to other media content M2, M3 which are financial documents for the organization requiring management level access permissions and having similar characteristics to the media content M1. User U3 may have access to the media content M1, but users U1 and U2 may not have access to the media content M1 and there may not be any communications between the requestor and the users U1 and U2 regarding media content M1. Moreover, user U5 may be in an intrinsically related organizational group, e.g., Office of the Chief Financial Officer, in a position superior to that of the requestor, and may be related to the requestor via communications between the requestor and user U5. Some of these communications from user U5 to the requestor may have referenced the media content M1, indicating a willingness within the organization by upper level personnel for the requestor to have access to the media content M1.

All of this information may be compiled by the requestor profile generator 124 into a profile for the requestor indicating that the requestor is a management level user that should have access to management level or below media content for the purposes of financial planning and evaluation on behalf of the organization. As noted above, weighted evaluations may be used and applied to the various pieces of information obtained to generate an evaluation as to various parameters of the profile to indicate settings for these parameters, e.g., security access level, types of content to be accessed, types of access to be provided, etc. The access decision engine 128 may utilize this information in the profile to compare the information to the context of the particular media content M1 for which access is requested, along with comparing the type of requested access in the original request to both the profile and the context, to determine an initial candidate response to the access request, e.g., allow, deny, or elevate the request to a human administrator via a notification message sent to the administrator's computing device via administrator interface engine 130.

An evidential evaluation, by the evidence analysis engine 126, of the candidate response may be performed, based on the various information retrieved to generate the context and the profile, to generate a weighted probability or confidence scoring of the candidate response. That is, it may initially be determined by the access decision engine 128 that the requestor should be granted access to the media content M1. Evidence supporting/refuting this candidate response may be evaluated by the evidence analysis engine 126 such as described above, e.g., an evaluation of similar users accessing similar media content, evaluation of other related users that have accessed the media content and their relationships with the requestor, etc. For example, the communications from the user U5 who is in a superior position to the requestor, which reference the media content M1 is indicative of a higher probability that the requestor should be given access to the media content M1. Other users that are subordinate to the requestor not having access to the media content M1 is evidence that is slightly supportive of the requestor having access to the media content and also may refute access being granted since these users may not have access because users in the particular group within the organization may not have access to such media content. However, evidence that other managers within the organization have access media content having similar characteristics to the media content M1 is evidence that perhaps the requestor, who is also a manager, should have access to the media content M1. This type of evidential evaluation may take many different forms in the evidence analysis engine 126, but in general will result in a confidence score indicating a confidence that the candidate response is correct.

If this confidence score meets or exceeds a predetermined threshold confidence value, then the candidate response may be adopted by the access decision engine 128 as a final response and corresponding access, denial of access, or elevation of the request may be performed. In cases where the confidence score does not meet or exceed the threshold requirement, then the access request may be treated in a default manner, e.g., automatically denied or automatically elevated to a next level of evaluation such as by a human administrator. Still further, as noted above, in some illustrative embodiments multiple thresholds may be utilized to determine candidate responses to access requests that are indeterminate or unclear and warranting further evaluation by a human administrator via administrator interface engine 130.

Thus, the illustrative embodiments provide mechanisms for dynamically determining whether to grant, deny, or elevate access requests to a resource, such as a portion of content, based on a cognitive evaluation of the requestor and the resource for which access is sought. The cognitive evaluation takes into consideration the characteristics of the resource, the characteristics of the requestor, as well as the characteristics of other similar resources and other users having a relation to the requestor or which have similar characteristics to that of the requestor. Evidential analysis is performed to generate a confidence measure as to whether the requestor should be granted/denied access to the resource based on a mode or profile of the requestor and a context of the resource, which are dynamically generated based on the cognitive evaluation. In cases where the evidential analysis results in an unclear determination, elevation of the access request may be made to a human administrator. In some embodiments, ACLs may be automatically and dynamically updated to add/remove the requestor based on a history of decisions made by the cognitive access control system regarding the requestor's access requests to the particular resource.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is an example block diagram illustrating an operation of a cognitive access control system when performing dynamic access control decisions for a portion of content in accordance with one illustrative embodiment. As shown in FIG. 3, in response to an access request for accessing a resource, such as a portion of content, the cognitive access control system 120 retrieves information from one or more corpora of information 395 which may include various information about the content, users, relationships between users, and the like. For example, the corpora of information 395 may include, but is not limited to, content metadata 302, a content access log 304, a content access control list 306, content metadata, access logs, and ACLs for other similar content 308, user account information 310 for the requestor and other users, communication system logs 312, website postings 314, organizational information 315, and the like. This information may be analyzed by the content context generator 122 to initially determine if cognitive evaluation of the access request should be performed, e.g., if the content is not protected by security or if the user is already listed on an ACL for the content then cognitive evaluation is not necessary, and then to generate a context for the content 330 should cognitive evaluation be determined to be needed. In addition, this information from the corpora 395 is also utilized by the requestor profile generator 124 to generate a profile for the requestor 340 to perform cognitive evaluation of the access request.

The content context 330 and requestor profile 340 are input to the access decision engine 128 which performs comparisons between these two data structures to determine a candidate response 350 to the access request. The candidate response 350 is input to the evidence analysis engine 126 which evaluates evidence from the corpora 395 to determine a confidence that the candidate response 350 is correct. The resulting confidence score 360 is input to the access decision engine 128 which then makes a decision regarding the access request as to whether to allow, deny, or elevate the request to a next level of evaluation. The access request response 370 indicating the decision is then output by the access decision engine 128. Depending on the decision made, the response 370 may be processed by the administrator interface engine 130 to obtain administrator intervention through the supplying of an administrator access confirmation interface 380 and receiving the administrator's response. If the access request response 370 indicates grant/deny, or if a response is received back from the administrator regarding whether to grant/deny, then the corresponding grant/deny controls are issued to appropriate systems for granting or denying the access request 390. Optionally, an update 392 to the access log 304 and/or ACL 306 of the content may be performed, such as previously described above.

Figure 4:
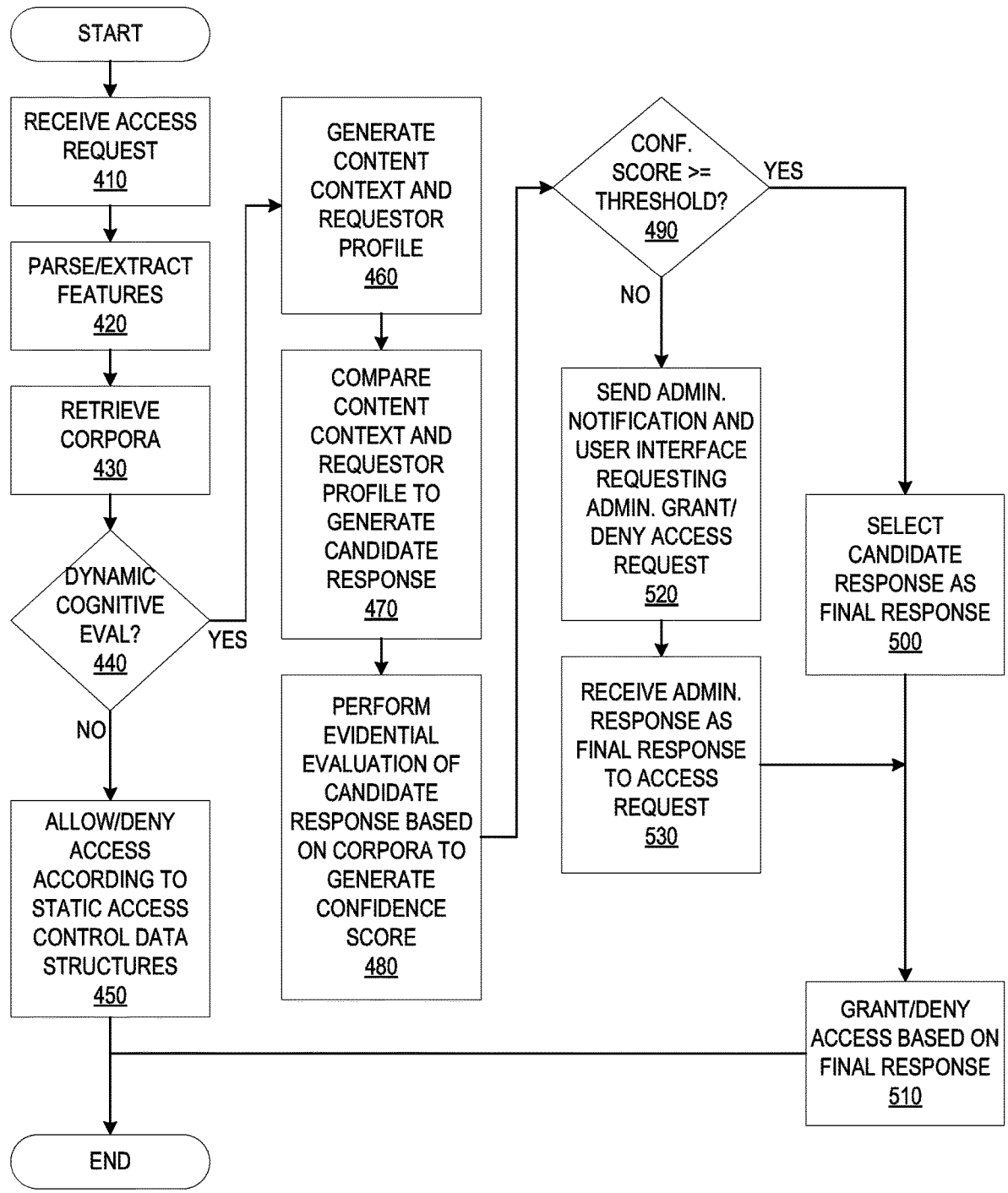
FIG. 4 is a flowchart outlining an example operation for performing dynamic access control decisions for a portion of content in accordance with one illustrative embodiment.

FIG. 4 is a flowchart outlining an example operation for performing dynamic access control decisions for a portion of content in accordance with one illustrative embodiment. As shown in FIG. 4, the operation starts by receiving an access request (step 410). The access request is parsed and features are extracted to identify the resource which is attempting to be accessed, the requestor, and a type of access requested (step 420). Corpora of information are accessed to retrieve information regarding the resource, requestor, similar resources, similar and related users, communications, access control lists, access logs, and the like (step 430). Based on the corpora of information, a determination is made as to whether dynamic cognitive access control evaluation is to be performed (step 440). If not, then access is allowed/denied according to static access control data structures (step 450) and the operation terminates.

If dynamic cognitive access control evaluation is to be performed, then a content context and requestor profile are generated (step 460). The content context and requestor profile are compared to generate a candidate response to the access request (step 470). The candidate response is evaluated based on evidence from the corpora of information to generate a confidence score indicating a confidence in the candidate response being correct (step 480). A determination is made as to whether the confidence score meets or exceeds a threshold confidence value (step 490). If so, then the corresponding candidate response is selected as a final response (step 500) and access to the resource is granted or denied based on the final response (step 510). The operation then terminates.

If the confidence score does not meet or exceed the first threshold confidence value, an administrator interface is output to an administrator computing device requesting administrator approval/denial of the access request (step 520). A response is received from the administrator (step 530) and the corresponding approval/denial of the access request is performed (step 510). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to configure the at least one processor to implement a cognitive access control system that operates to perform the method comprising:
   receiving, by the cognitive access control system, an access request from a requestor for accessing a resource, wherein the resource is a portion of digital content or an electronic device, and wherein the cognitive access control system parses and processes the access request to extract features from the access request specifying the requestor, the resource, and an access requested;
   determining whether an identifier of the requestor is present in an access control list data structure associated with the resource;
   granting access by the requestor to the resource in response to the identifier of the requestor being present in the access control list data structure; and
   in response to the identifier of the requestor not being present in the access control list data structure:
   generating, by the cognitive access control system, a context for the resource based on one or more first corpora of information regarding the resource;
   generating, by the cognitive access control system, a requestor profile for the requestor based on one or more second corpora of information regarding the requestor, other users, and relationships between the requestor and the other users, wherein generating the requestor profile comprises generating a computer model representing the requestor based on a cognitive computing evaluation of similarities of user characteristics of the requestor with characteristics of other users, that have access to the resource and with which the requestor has relationships, and characteristics of other resources to which the other users have access, as indicated by the one or more second corpora of information;
   comparing, by the cognitive access control system, elements of the context for the resource with elements of the requestor profile;
   generating, by the cognitive access control system, a decision as to whether to grant or deny the access request based on results of the comparison; and
   controlling, by the cognitive access control system, access to the resource based on the decision, wherein the context for the resource and the requestor profile are dynamically generated in response to receiving the access request and are not stored prior to receiving the access request.

2. The method of claim 1, wherein the context for the resource provides information characterizing one or more types of users that should be allowed to access the resource, and wherein the requestor profile provides information characterizing a type of user that the requestor is determined to be.

3. The method of claim 1, wherein the one or more second corpora of information comprises one or more data structures specifying at least one of relationships between the requestor and one or more of the other users or other users having similar roles or job descriptions within an organization as the requestor, and access permissions associated with these other users.

4. The method of claim 1, wherein generating the decision comprises:
   generating an initial decision based on the comparison of the elements of the context with elements of the requestor profile; and
   performing an evidential analysis of information in one or more third corpora to determine whether to confirm or reject the initial decision, wherein the evidential analysis identifies evidence in the one or more third corpora that at least one of refutes or supports the initial decision.

5. The method of claim 1, wherein the one or more first corpora of information regarding the resource comprises at least one portion of information selected from the group consisting of metadata associated with the resource, access control list data structures associated with the resource, communications exchanged by users referencing the resource, communications exchanged by users that are associated with the resource, and identities and profile information about users that have accessed the content.

6. The method of claim 1, further comprising, in response to generating the decision resulting in a decision to grant the requestor access to the resource:

determining whether the requestor has been granted access to the resource more than a threshold number of times; and in response to the requestor having been granted access to the resource more than a threshold number of times, either adding an identifier of the requestor to a static access control list associated with the resource or sending a notification to a system administrator recommending adding the identifier of the requestor to the static access control list data structure associated with the resource.

7. The method of claim 1, wherein controlling access to the resource comprises at least one operation selected from the group consisting of allowing access to the resource by the requester, denying access to the resource by the requester, and elevating evaluation of the access request to a next higher level of security evaluation in a multi-level access control security protocol.

8. The method of claim 4, wherein performing the evidential analysis comprises:

generating, for the initial decision, a confidence score based on a statistical analysis of evidence that at least one of confirms or rejects the initial decision;

comparing the confidence score to a first threshold confidence value; and in response to the confidence score being equal to or above the first threshold confidence value, using the initial decision as the decision for controlling access to the resource.

9. The method of claim 8, wherein performing the evidential analysis further comprises:

In response to the confidence score not being equal to or above the first threshold confidence value, comparing the confidence score to a second threshold confidence value; and in response to the confidence score being equal to or above the second threshold confidence value but below the first threshold confidence value, sending a request communication to a human administrator to evaluate the access request.

10. The method of claim 1, wherein generating the requestor profile comprises determining a statistical measure of frequency of occurrence of similar user characteristics of the requestor with characteristics of the other users and generating an amalgam of characteristics of the requestor and the other users based on the frequency of occurrence of the similar user characteristics and characteristics of other users.

11. The method of claim 10, wherein the amalgam of characteristics is generated using a weighted evaluation of characteristics of other users based on a level of the characteristics of the other users with the user characteristics of the requester.

12. The method of claim 11, wherein different characteristics of other users are given different weight values in the weighted evaluation.

13. The method of claim 1, wherein controlling access to the resource comprises sending control communications to computing elements to cause the requestor to be able to access the resource or block access to the resource.

14. A computer program product comprising a computer readable storage medium having a computer readable program stored therein, wherein the computer readable program, when executed on a computing device, causes the computing device to:

receive an access request from a requestor for accessing a resource, wherein the resource is a portion of digital content or an electronic device, and wherein a cognitive access control system of the computing device parses and processes the access request to extract features from the access request specifying the requestor, the resource, and an access requested;

determine whether an identifier of the requestor is present in an access control list data structure associated with the resource;

grant access by the requestor to the resource in response to the identifier of the requestor being present in the access control list data structure; and in response to the identifier of the requestor not being present in the access control list data structure:

generate a context for the resource based on one or more first corpora of information regarding the resource;

generate a requestor profile for the requestor based on one or more second corpora of information regarding the requestor, other users, and relationships between the requestor and the other users, wherein generating the requestor profile comprises generating a computer model representing the requestor based on a cognitive computing evaluation of similarities of user characteristics of the requestor with characteristics of other users, that have access to the resource and with which the requestor has relationships, and characteristics of other resources to which the other users have access, as indicated by the one or more second corpora of information;

compare elements of the context for the resource with elements of the requestor profile;

generate a decision as to whether to grant or deny the access request based on results of the comparison; and control access to the resource based on the decision, wherein the context for the resource and the requestor profile are dynamically generated in response to receiving the access request and are not stored prior to receiving the access request.

15. The computer program product of claim 14, wherein the context for the resource provides information characterizing one or more types of users that should be allowed to access the resource, and wherein the requestor profile provides information characterizing a type of user that the requestor is determined to be.

16. The computer program product of claim 14, wherein the one or more second corpora of information comprises one or more data structures specifying at least one of relationships between the requestor and one or more of the other users or other users having similar roles or job descriptions within an organization as the requester, and access permissions associated with these other users.

17. The computer program product of claim 14, wherein the computer readable program further causes the computing device to generate the decision at least by:

generating an initial decision based on the comparison of the elements of the context with elements of the requester profile; and performing an evidential analysis of information in one or more third corpora to determine whether to confirm or reject the initial decision, wherein the evidential analysis identifies evidence in the one or more third corpora that at least one of refutes or supports the initial decision.

18. The computer program product of claim 14, wherein the one or more first corpora of information regarding the resource comprises at least one portion of information selected from the group consisting of metadata associated with the resource, access control list data structures associated with the resource, communications exchanged by users referencing the resource, communications exchanged by users that are associated with the resource, and identities and profile information about users that have accessed the content.

19. The computer program product of claim 14, wherein the computer readable program further causes the computing device, in response to generating the decision resulting in a decision to grant the requester access to the resource, to:
determine whether the requestor has been granted access to the resource more than a threshold number of times; and
in response to the requestor having been granted access to the resource more than a threshold number of times, either add an identifier of the requestor to a static access control list associated with the resource or send a notification to a system administrator recommending adding the identifier of the requestor to the static access control list data structure associated with the resource.

20. An apparatus comprising:
a processor; and
a memory coupled to the processor, wherein the memory comprises instructions which, when executed by the processor, cause the processor to:
receive an access request from a requestor for accessing a resource, wherein the resource is a portion of digital content or an electronic device, and wherein a cognitive access control system of the apparatus parses and processes the access request to extract features from the access request specifying the requestor, the resource, and an access requested;
determine whether an identifier of the requestor is present in an access control list data structure associated with the resource;
grant access by the requestor to the resource in response to the identifier of the requestor being present in the access control list data structure; and
in response to the identifier of the requestor not being present in the access control list data structure:
generate a context for the resource based on one or more first corpora of information regarding the resource;
generate a requestor profile for the requestor based on one or more second corpora of information regarding the requestor, other users, and relationships between the requestor and the other users, wherein generating the requestor profile comprises generating a computer model representing the requestor based on a cognitive computing evaluation of similarities of user characteristics of the requestor with characteristics of other users, that have access to the resource and with which the requestor has relationships, and characteristics of other resources to which the other users have access, as indicated by the one or more second corpora of information;
compare elements of the context for the resource with elements of the requestor profile;
generate a decision as to whether to grant or deny the access request based on results of the comparison; and
control access to the resource based on the decision, wherein the context for the resource and the requestor profile are dynamically generated in response to receiving the access request and are not stored prior to receiving the access request.

* * * * *